US007996306B2

(12) United States Patent
Gonen et al.

(10) Patent No.: US 7,996,306 B2
(45) Date of Patent: Aug. 9, 2011

(54) SYSTEM AND METHOD FOR PAYMENT OVER A SERIES OF TIME PERIODS IN AN ONLINE MARKET WITH BUDGET AND TIME CONSTRAINTS

(75) Inventors: Rica Gonen, Sunnyvale, CA (US); Elan Y. Pavlov, Cambridge, MA (US)

(73) Assignee: Yahoo! Inc., Sunnyvale, CA (US)

( * ) Notice: Subject to any disclaimer, the term of this patent is extended or adjusted under 35 U.S.C. 154(b) by 339 days.

(21) Appl. No.: 11/900,523

(22) Filed: Sep. 10, 2007

(65) Prior Publication Data

US 2009/0070251 A1    Mar. 12, 2009

(51) Int. Cl.
*G06Q 40/00*   (2006.01)
(52) U.S. Cl. ..... 705/39; 705/14.1; 705/14.6; 705/14.21; 713/189; 713/176
(58) Field of Classification Search .............. 705/39, 705/14, 14.1, 10, 14.6, 14.13, 14.21; 713/189; 726/28
See application file for complete search history.

(56) References Cited

U.S. PATENT DOCUMENTS

| | | | | |
|---|---|---|---|---|
| 2004/0103024 A1* | 5/2004 | Patel et al. | ...... | 705/14 |
| 2008/0294549 A1* | 11/2008 | Leader | ...... | 705/39 |
| 2009/0106100 A1* | 4/2009 | Mashinsky | ...... | 705/14 |
| 2010/0228996 A1* | 9/2010 | Ginter et al. | ...... | 713/189 |

OTHER PUBLICATIONS

Feng, Juan; Bhargava, Hemant K; Pennock, David M, Implementing sponsored search in web search engines: computational evaluation of alternative mechanisms, Winter 2007, Journal on Computing, v19n1, pp. 137-148.*
The high price of internet ad auctions—stanford buinsess school research, Jan. 17, 2006, Business Wire, p NA.*

* cited by examiner

*Primary Examiner* — Behrang Badii
(74) *Attorney, Agent, or Firm* — Buchenhomer Patent Law (57) ABSTRACT

An improved system and method is provided for using sampling for scheduling advertisements in an online auction with budget and time constraints. A multi-armed bandit engine may be provided for sampling new advertisements by allocating advertisements for web page placements of equal quality and optimizing payments to maximize the welfare of the advertisers while remaining within advertiser's budget and time constraints. Advertisers may report their private information including arrival time, departure time, value per click, and budget. And the multi-armed bandit mechanism may approximate the maximal welfare that may be achieved under budget and time constraints by bounding the possible gain from any possible lie an advertiser might submit in reporting private information. Advertisers departing from the online auction may be charged using a payment method that may provide truthful guarantees on budget, arrivals, departures, and valuations for a budget-constrained online auction.

8 Claims, 9 Drawing Sheets

SYSTEM AND METHOD FOR PAYMENT OVER A SERIES OF TIME PERIODS IN AN ONLINE MARKET WITH BUDGET AND TIME CONSTRAINTS

CROSS-REFERENCE TO RELATED APPLICATIONS

The present invention is related to the following United States patent applications, filed concurrently herewith:

"System and Method Using Sampling for Scheduling Advertisements in an Online Auction with Budget and Time Constraints," Ser. No. 11/900,524; and "System and Method Using Sampling for Scheduling Advertisements in Slots of Different Quality in an Online Auction with Budget and Time Constraints," Ser. No. 11/900,522.

FIELD OF THE INVENTION

The invention relates generally to computer systems, and more particularly to an improved system and method for payment over a series of time periods in an online market with budget and time constraints.

BACKGROUND OF THE INVENTION

With the advent of advertising as a pillar of Internet commerce, there is an acute need for improved means of increasing the value achieved by advertising agencies. Unfortunately, advertisers may attempt to manipulate existing online advertisement placement systems for competitive advantage. Current online advertising placement systems fail to provide incentives for advertisers to declare their private information such as true budget, entry time, exit time, and bid value. Without incentives to provide accurate private information in existing advertising placement systems, advertisers may continue to attempt to manipulate the ad placement systems for competitive advantage.

For instance, an advertiser may attempt to manipulate an ad placement system by timing the entry and exit time to reduce competition with other bidders and thereby lower the price per click for allocated advertisement placements. Or an advertiser may attempt to manipulate an advertising placement system by underbidding competitors, causing competitors to quickly consume their budgets at a high price, and then bidding for clicks at a lower rate without interference from competitors. Or an advertiser may attempt to manipulate an ad placement system by reporting a small budget to gain finer time granularity in pricing control. This may allow an advertiser to attempt to end a campaign before competition arrives or to prevent his budget from being exhausted by competitors engaging in underbidding. Such behavior calculated to manipulate the ad placement systems in any of these ways may additionally cause advertiser churn from budget exhaustion by overbidding.

There is a need to find incentives that may motivate advertisers to honestly report their private information, including valuations, for any possible allocation. Indeed, in assuming that advertisers have a known valuation per click as well as a bounded budget, many authors have suggested algorithms that increase welfare for the search engine. See for example G. Aggarwal, A. Goel and R. Motwani, *Truthful Auctions for Pricing Search Keywords*, Proceeding of EC'06. Some authors have even suggested mechanisms which do not assume the knowledge of click-through rates (CTRs) but learn them while running the algorithm. See S. Pandey and C. Olston, *Handling Advertisements of Unknown Quality in Search Advertising*, to appear in the proceedings of NIPS 06. However, the assumption of known valuations is arguably unrealistic. In practice advertisers' values are private information, and hence advertisers might be motivated to act strategically to increase their utility.

What is needed is a system and method for allocating advertisement placement where private information including the valuation may be unknown. Such a system and method should give advertisers an incentive to declare bids with true valuations, accurately declare their budget for an arrival and departure time, accurately learn the CTR for advertisements, and minimize loss of welfare of the advertisers.

SUMMARY OF THE INVENTION

Briefly, the present invention may provide a system and method using sampling for scheduling advertisements in an online auction with budget and time constraints. In an embodiment, a multi-armed bandit engine may be provided for sampling new advertisements by allocating advertisements for web page placements of equal quality and optimizing payments to maximize the welfare of the advertisers while remaining within advertiser's budget and time constraints. Advertisers may report their private information including arrival time, departure time, value per click, and budget. And the multi-armed bandit mechanism may approximate the maximal welfare that may be achieved under budget and time constraints by bounding the possible gain from any possible lie an advertiser might submit in reporting private information.

In general, the multi-armed bandit mechanism may run in time rounds, and advertisements of selected advertisers may be allocated web page placements. If there are more advertisements of selected advertisers than the number of web page placements, then the advertisements may continue to be sampled in rounds in the online advertising auction. A set of advertisers in the online auction may be selected for sampling advertisements in the online advertising auction. Then a subset of the selected set of advertisers in the online auction may be randomly selecting and advertisements for the subset of randomly selected advertisers may be sampled. Parameters for advertisers sampled in the online auction may be updated including the click-through rate, total clicks of advertisements, payoff rate, and click-through status sets. And then parameters, such as critical values, interim price, and remaining budget, may be updated for advertisers in the online auction, including those not sampled. Finally, advertisers departing from the online auction may be charged using a payment method that may provide truthful guarantees on budget, arrivals, departures, and valuations for a budget-constrained sponsored search auction.

The payment method may consider both the critical value per round, that is the minimum value that allows an advertiser to be allocated a web page placement in the computed round, and the critical values series for possible rounds during an advertiser's stay in the online auction. First, for every advertiser, the payment method may compute the critical value of each time round. Second, the payment method may find the critical series of clicks, meaning the minimum sum of values that could have resulted in the same number of clicks that the advertiser actually gained in his current stay in the online auction. To do so, critical values may be received in a given time period for a series of time periods since the arrival of each of the advertisers entering in the online advertising auction. A critical value may represent a minimum value for an advertisement of an advertiser to be allocated a web page placement in a given time period. A click-through status set representing the number of impressions, clicks for advertisements, and no impressions for each of the series of time periods may also be received for each advertiser in the online advertising auction. And a price for the series of time periods may be determined using the critical values for the series of time periods and the click-through status sets by choosing the smallest critical values in the click-through status set for each of the time periods in the series since the advertisers entered the online advertising auction.

An online auction application may deploy the present invention to learn the valuation of new advertisements using sampling in an online auction with budget and time constraints. Through a process of valuation discovery, the click-through rate for advertisements may be learned and the value of advertisements to advertisers with budget constraints may be learned. As the process of valuation discovery progresses, the algorithm more closely approximates the click-through rates for advertisements in order to allocate web page placements to advertisements that may maximize the welfare of the advertisers while remaining within advertiser's budget and time constraints. Other advantages will become apparent from the following detailed description when taken in conjunction with the drawings, in which:

DETAILED DESCRIPTION

Exemplary Operating Environment

Figure 1:
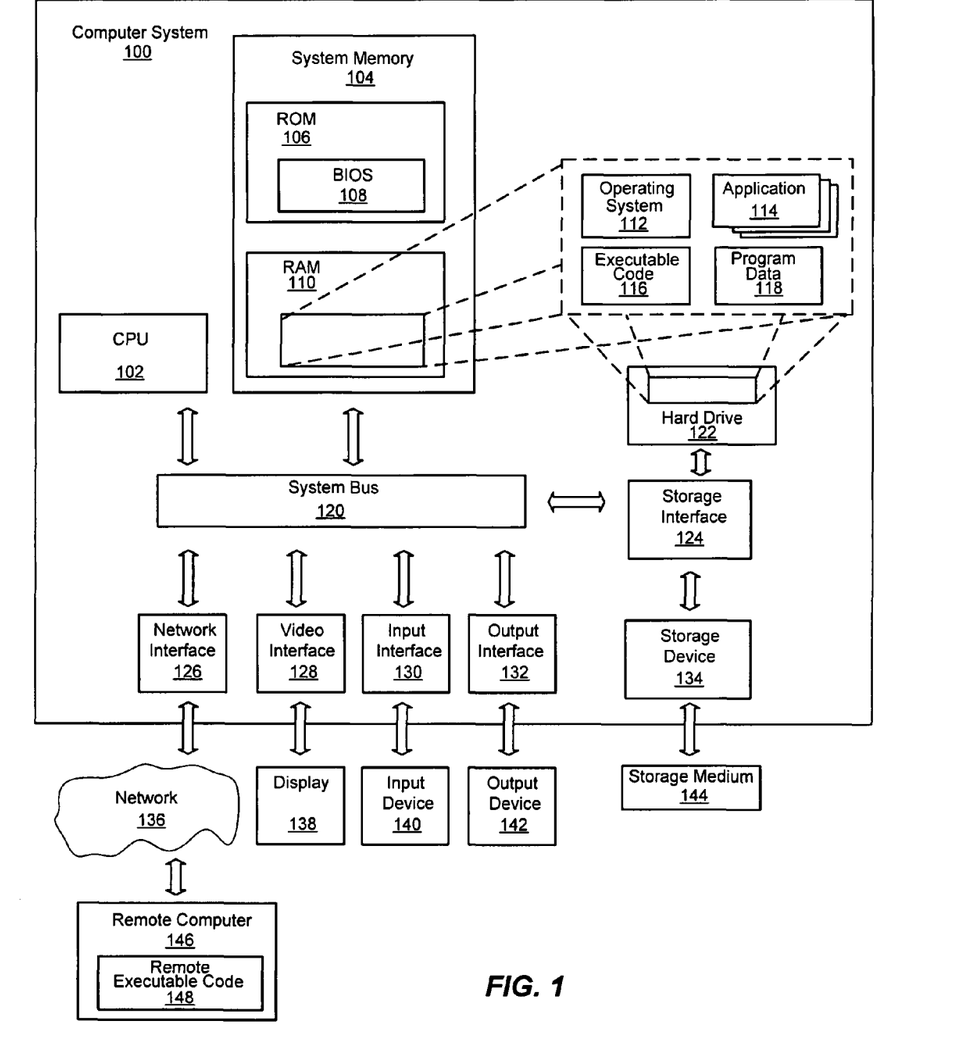
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Scheduling Advertisements Using Sampling in an Online Auction with Budget and the Time Constraints The present invention is generally directed towards a system and method using sampling for scheduling advertisements in an online auction with budget and time constraints. A multi-armed bandit model may be created for sampling new advertisements by allocating advertisements for web page placements of equal quality and optimizing payments to maximize the welfare of the advertisers while remaining within advertiser's budget and time constraints. As used herein, a web page placement may mean a location on a web page designated for placing an item for display. The item may be an advertisement, content, a product, a service, or any other item that may be auctioned. A web page placement may also include additional information such as a target group of visitors to be shown the item. An online auction application may deploy a multi-armed bandit engine to learn the valuation of new advertisements using sampling in an online auction with budget and time constraints. Through a process of valuation discovery, the click-through rate for advertisements may be learned and the value of advertisements to advertisers with budget constraints may be learned. As the process of valuation discovery progresses, the algorithm more closely approximates the click-through rates for advertisements in order to allocate web page placements to advertisements that may maximize the welfare of the advertisers while remaining within advertiser's budget and time constraints.

As will be seen, the framework described may support many online auction applications for learning the valuation of new advertisements in online auctions with budget and time constraints. For example, online advertising applications may use the present invention to optimize bids for auctioning advertisement placement for keywords of search queries. As will be understood, the various block diagrams, flow charts and scenarios described herein are only examples, and there are many other scenarios to which the present invention will apply.

Figure 2:
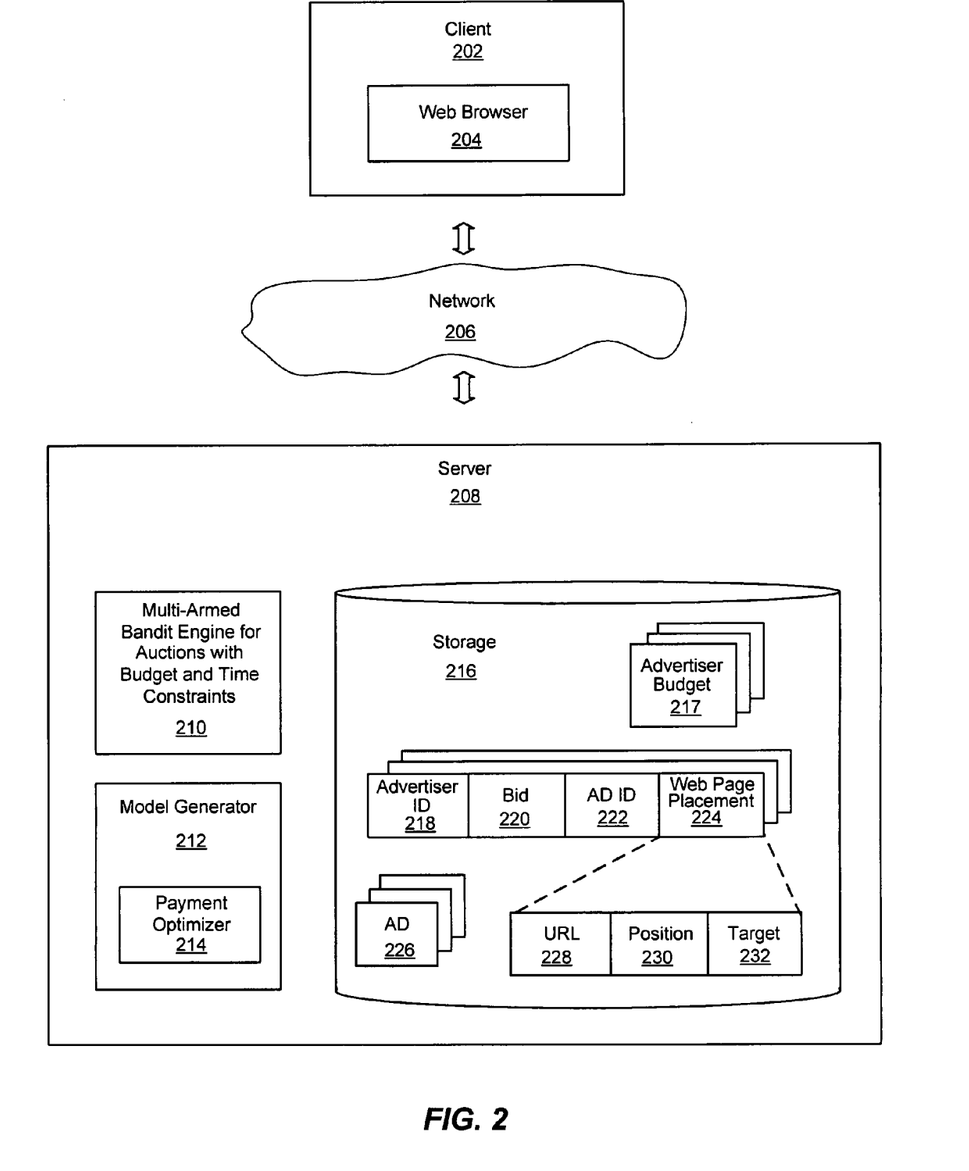
FIG. 2 is a block diagram generally representing an exemplary architecture of system components for using sampling for scheduling advertisements in an online auction with budget and time constraints, in accordance with an aspect of the present invention.

Turning to FIG. 2 of the drawings, there is shown a block diagram generally representing an exemplary architecture of system components for using sampling for scheduling advertisements in an online auction with budget and time constraints. Those skilled in the art will appreciate that the functionality implemented within the blocks illustrated in the diagram may be implemented as separate components or the functionality of several or all of the blocks may be implemented within a single component. For example, the functionality for the model generator 212 may be included in the same component as the multi-armed bandit engine for budget and time constraints 210. Or the functionality of the payoff optimizer 214 may be implemented as a separate component from the model generator 212. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 208 by a network 206. The client computer 202 may be a computer such as computer system 100 of FIG. 1. The network 206 may be any type of network such as a local area network (LAN), a wide area network (WAN), or other type of network. A web browser 204 may execute on the client computer 202 and may include functionality for receiving a search request which may be input by a user entering a query. The web browser 204 may include functionality for receiving a query entered by a user and for sending a query request to a server to obtain a list of search results. In general, the web browser 204 may be any type of interpreted or executable software code such as a kernel component, an application program, a script, a linked library, an object with methods, and so forth.

The server 208 may be any type of computer system or computing device such as computer system 100 of FIG. 1. In general, the server 208 may provide services for query processing and may include services for providing a list of auctioned advertisements to accompany the search results of query processing. In particular, the server 208 may include a multi-armed bandit engine for auctions with budget and time constraints 210 for choosing advertisements for web page placement locations, a model generator 212 for creating a multi-armed bandit model with budget and time constraints used by the multi-armed bandit engine for auctions with budget and time constraints 210, and a payoff optimizer 214 for optimizing payments to maximize the welfare of the advertisers while remaining within advertiser's budget and time constraints. Each of these modules may also be any type of executable software code such as a kernel component, an application program, a linked library, an object with methods, or other type of executable software code.

The server 208 may be operably coupled to a database of information such as storage 216 that may include an advertiser's budget 217, an advertiser ID 218 that may be associated with a bid amount 220 for an advertisement referenced by advertisement ID 222 to be displayed according to the web page placement 224. The web page placement 224 may include a Uniform Resource Locator (URL) 228 for a web page, a position 230 for displaying an advertisement on the web page, and a target ID 232 for referencing a target or group of visitors that may be defined by a profile of characteristics that may match a visitor of the web page. In various embodiments, a target may be defined by demographic information including gender, age, or surfing behavior. Any type of advertisements 226 may be associated with an advertisement ID 218. Advertisers may have multiple advertiser IDs 218 representing several bid amounts for various web page placements and the payments for allocating web page placements for bids may be optimized using the multi-armed bandit engine for auctions with budget and time constraints to maximize the welfare of the advertisers while remaining within advertiser's budget and time constraints.

There may be many applications which may use the present invention for scheduling advertisements in an online auction with budget and time constraints. For example, online advertising applications may use the present invention to optimize payment for auctioning advertisement placement for keywords of search queries. Or online advertising applications may use the present invention to optimize payments for classes of advertisements to be shown to classes of users. For any of these applications, advertisement auctions may optimize payments to maximize the welfare of the advertisers while remaining within advertiser's budget and time constraints.

A classic multi-armed bandit (MAB) that may be generalized to allow the allocation of web page placements may be used to learn advertisers' valuations under budget and time constraints. In general, the multi-armed bandit is a well studied problem (see, for example, D. A. Berry and B. Fristedt, *Bandit Problems*, Sequential Allocation of Experiments, Chapman and Hall, 1985; H. Robbins, *Some Aspects of the Sequential Design of Experiments*, In Bulletin of the American Mathematical Society, volume 55, pages 527-535, 1952) which deals with the balancing of exploration and exploitation in online problems with multiple possible solutions. In the simplest version of the MAB problem, a user must choose at each stage (the number of stages is known in advance) a single bandit/arm. This bandit will yield a reward which depends on some hidden distribution. The user must then choose whether to exploit the currently best known distribution or to attempt to gather more information on a distribution that currently appears suboptimal. The MAB is known to be solvable via the Gittins index (see, for example, J. C. Gittins, Multi-armed Bandit Allocation Indices, Wiley, N.Y., Mathematical Reviews: MR90e:62113, 1989) and there are solutions which approximate the optimal expected payoff. Due to its simplicity and optimal sampling complexity, the MAB solution in E. Even-Dar, S. Manor, and Y. Mansour, *PAC Bounds for Multi-Armed Bandit and Markov Decision Processes*, The Fifthteenth Annual Conference on Computational Learning Theory 2002, may be generalized for use in allowing the allocation of web page placements for advertisers who arrive and depart online during a time period, have a value per click, and are budget constrained.

Although the MAB has been extensively studied, it has generally been studied in the context of a single user choosing from non-strategic arms (see R. Kleinberg, *Anytime Algorithms for Multi-Armed Bandit Problems*, Proceedings of the 17$^{th}$ ACM-SIAM Symposium on Discrete Algorithms (SODA 2006)), even when studied in the context of slot auctions (see S. Pandey and C. Oston, *Handling Advertising of Unknown Quality in Search Advertising*, NIPS 2006). However, the MAB has not been previously implemented in previous work as a truthful mechanism for strategic arms, allowing slots of equal quality, and advertiser private information to be reported, including arrival time, departure time, value per click, and budget. In the context of an online auction for keywords, the arms/advertisers will act as strategic utility-maximizing agents. By defining the keyword problem as an instance of a truthful mechanism for MAB, the optimal payoff for the MAB may be approximated, and hence the optimal welfare for the auction may be approximated under budget and time constraints.

To approximate the optimal welfare for an auction under budget and time constraints, a new concept called δ-gain may be defined which bounds the utility an advertiser can gain by lying as opposed to his utility when telling the truth. Building on the δ-gain concept another new concept called relative ε-gain may be defined which bounds the relative ratio of the gain an advertiser can achieve by lying with respect to his true utility. For many practical applications, if the δ-gain and or the relative ε-gain are small, then it may be likely that an advertiser will not invest time and effort in making strategic choices, but will truth-tell as a default strategy for reporting private information such as arrival time, departure time, value per click, and budget. These concepts capture the essence of dominant strategy mechanisms that may lead an advertiser to choose truth-telling over other strategies.

In order to achieve a δ-gain truthful mechanism, a new payment scheme, referred to as the Time series Truthful Payment Scheme (TTPS), may be introduced for an online budget-constrained auction mechanism. The payment scheme is a generalization of the VCG principles for an online scheduling environment with budgeted advertisers. Using the concepts of a δ-gain truthful mechanism, the present invention may provide the only known budget-constrained sponsored search auction with truthful guarantees on budget, arrivals, departures, and valuations.

In the model of the present invention, N risk neutral, utility maximizing advertisers may bid for advertising slots based on a keyword. The present invention may also apply for a bidding process for multiple keywords since it may be analogous to bidding for a single keyword. Suppose without loss of generality that the keywords appear at every time t. Whenever that keyword appears in the search at time t, $K_t$ slots of advertisements appear in the results. Assume for the ease of exposition that $K_t=K_{t+1}=K$ for all time period t. Also assume without the loss of generality that K=N, since superfluous slots can remain blank. The advertisers may arrive and depart during the online auction and, further, may arrive and depart several times. As used herein, a stay may mean or refer to the duration of each period of time between an advertiser's arrival and departure in an online auction. Consider $S_t$ to denote the set of advertisers present in the online auction at time t. Each advertiser i may have a private value for each click through which may be denoted by $v_i$. This value may be independent of the slot the ad originally appeared in. Also assume that for every arrival and departure, each advertiser i also has privately known arrival and departure times, denoted $a_i$ and $l_i$ respectively, and a privately known budget denoted $b_i$.

The algorithm may run in time rounds starting at t=1 and ending at t=T. During each round, the algorithm allocates advertisers to the $K_t$ slots (or if there are too many slots to some portion of the slots). When advertiser i appears in a slot during some time period t, then i may be considered to have received an impression. Consider $e_i$ to denote the number of impressions that advertiser i receives from i's first arrival. Also consider $w_i$ to denote the number of clicks that advertiser i received during his current stay in the online auction.

Furthermore, assume that the "quality" of each slot (which may be essentially the probability of a click though if an advertisement appears in that slot) may be identical in all $K_t$ slots and may be independent of the advertisers. Each advertiser i may then have a click through rate $\alpha_i$ which may represent the probability of a click on the advertisement given that the advertiser was allotted an impression. This value may be unknown to i as well as to the mechanism. Since $\alpha_i$ may be unknown to i and the mechanism, it may be estimated at each time t and the observed probability may be denoted by $\alpha_i^t$.

Finally, consider the bid for each click-through stated by advertiser i to the mechanism to be denoted by $\bar{v}_i$ (which might not be the true value). Also consider $\bar{a}_i$, $\bar{l}_i$, and $\bar{b}_i$ respectively denote the arrival time, the departure time, and the budget stated by advertiser i to the mechanism when advertiser i enters the online auction. Note that $a_i$ and $l_i$ may be reported multiple times with multiple entries to the online auction. To achieve a truthful report of budget, time, and value, assume that advertiser i's reported budget, $b_i$, may be significantly larger than his value, i.e., $\bar{b}_i \gg v_i$ for every advertiser. In practice, this is indeed the case for many keywords auctions.

For ease of exposition, consider $\overline{X}_i$ to denote the vector of parameters stated by advertiser i in a single arrival, that is ($\bar{a}_i$, $\bar{l}_i$, $\bar{v}_i$, $\bar{b}_i$). The mechanism may charge advertiser i a price denoted as $p^{l_i}$ every time i departs. At every round, advertiser i may be charged an "interim price" $p_i^t$, such that $p_i^t \leq w_i \bar{v}_i$, where $w_i$ may be the number of clicks i received during the current sojourn in the online auction from $\bar{a}_i$ to time t. This interim price may decrease or increase as time goes on. Since advertisers are budget constrained, consider $B_i^t \geq 0$ to denote the budget i has remaining at time t. It is assumed that advertisers may have quasi-linear utility functions and, consequently, at each departure time advertiser i may obtain a utility of $\alpha_i^{l_i} \cdot (w_i \cdot v_i - p^{l_i})$.

A multi-armed bandit mechanism may be applied to a model of advertisers bidding for advertising slots based on a keyword. In general, the multi-armed bandit problem is a statistical decision model of an agent trying to optimize his decisions while improving his information at the same time. More particularly, in the multi-arm bandit problem, the gambler has to decide which arm of K different slot machines to play in a sequence of trials so as to maximize his reward.

In practice, the bandit problem may be formulated as an infinite horizon Markov decision problem in discrete time with time index t=0, 1, ... T. At each time t the decision maker chooses amongst N arms and this choice may be denoted by $a_t \in \{1, \ldots, N\}$. If $a_t=i$, a random payoff $x_t^i$ is realized and the associated random variable may be denoted by $X_t^i$. Applied to the model of the slot auction, $x_t^i = \alpha_i^t \cdot v_i$ where the click through rate $\alpha_i^t$ may be the random payoff element of the problem while the value $v_i$ may be a constant, hence the total payoff for arm i may be $v_i \times \alpha_i^t$. The state variable of the Markovian decision problem is given by $s_t$, where in the model of the slot auction, a vector of all allocated advertisers click-through-rates at time t, $\alpha_i^t$ and 0 if i is not allocated a slot in time t. The distribution of $x_t^i$ may be $F^i(\cdot; s_t)$.

The state transition function $\phi$ depends on the choice of the arm and the realized payoff: $s_{t+1} = \phi(x_t^i; s_t)$. Consider $S_t$ to denote the set of possible states in period t. A feasible Markov policy $a = \{a_t\}_{t=0}^{\infty}$ may select an available alternative for each conceivable state $s_t$, i.e., $a_t: S_t \to \{1, \ldots, N\}$. Payoffs may be evaluated according to the discounted expected payoff criterion where the discount factor $\chi$ satisfies $0 \leq \chi < 1$. The motivation for assuming a discount factor is that the seller of the slot auction prefers payment sooner rather than later. The payoff from each i depends only on outcomes of periods with $a_t=i$. In other words, the state variable $s_t$ may be decomposed into N components ($s_t^1, \ldots s_t^N$) such that for all $i: s_{t+1}^i = s_t^i$ if $a_t \neq i$, $s_{t+1}^i = \phi(s_t^i; x_t)$ if $a_t=i$, and $F^i(\cdot; s_t) = F^i(\cdot; s_t^i)$.

Consider $X^i(s_t^i)$ to denote the random variable with distribution $F^i(\cdot; s_t^i)$. Then the problem of finding the optimal allocation policy may be the solution to the following intertemporal optimization problem:

$$V(s_0) = \sup_a \left\{ E \sum_{t=0}^{\infty} \chi^t X^{a_t}(s_t^{a_t}) \right\},$$

where $V(s_0)$ is the value function of the bandit problem.

The algorithm for a multi-armed bandit mechanism applied to the model of advertisers bidding for advertising slots based on a keyword may be illustrated in an embodiment for the simple case when there may be a single slot available at any given time. In this case for each time period t, the set of available advertisers $S_t$ might increase or decrease since advertisers may enter and depart the system during any time period. For each advertiser, $i \in S_t$, there may be an estimation of i's click through rate $\alpha_i^t$ as well as an estimate of how accurate that estimation may be using a bound, denoted as $\gamma_{e_i}$, on $|\alpha_i^t - \alpha_t|$ which depends on the number of impressions $e_i$ that advertiser i received.

Considering the set $S_t$, there may be an i such that $v_i * \alpha_i^t$ may be maximal. Suppose without loss of generality that the maximal element may be the first element that the bandit algorithm may explore by allocating a slot to that first element. If the algorithm merely chooses to exploit then it could just allocate the slot to the advertisement of the first advertiser. However, there may be other possible advertisers that are worthy of consideration. These may be advertisers j such that $v_i(\alpha_i^t - \gamma_{e_i}) < v_j(\alpha_j^t - \gamma_{e_j})$, since the errors of i and j overlap.

Therefore, the algorithm may allocate the slot to a random advertiser whose slot overlaps with the maximal element.

This algorithm may work if the players are non-strategic. Of course, if the advertisers are strategic, then the advertisers would have to be motivated to give the correct values. If advertisers' arrival and departure times are public knowledge, then prices for allocated advertisers could be set that may be defined as the critical values at each time to receive the slot, such as the minimum value advertiser i can report and still be allocated to the slot, in order to extract true reported values from the advertisers. However, since arrival and departure times may not be assumed to be public knowledge, the solution may utilize incentives via payment rules to motivate advertisers to honestly report their valuations for possible allocations.

As an overview, the payment rules may operate at two levels: the critical value per round and the critical values series for possible rounds during a stay in the online auction. First, for every advertiser, the algorithm may compute the critical value of each time round. The critical value may be the minimum value that allows the advertiser to win in the computed round. If the auction were not an online auction, the critical value of a round may be considered sufficient for the pricing scheme to maintain truthfulness. However, for an online auction, the algorithm should consider all possible series of clicks that the advertiser could have potentially enjoyed in his current stay. For instance, if advertiser i may have gained 5 clicks during a stay, the algorithm should consider all series of 5 time rounds where advertiser i could have potentially received a click.

In general, the algorithm needs to consider rounds where i could have received a click, where i actually got a click (and obviously also received an impression), and where i may not have received an impression but possibly could have. In the rounds where i received an impression but not a click, it may be assumed that i could not have possibly received a click since the user did not click on the advertisement.

Second, the algorithm may find the critical series of clicks, meaning the minimum sum of values that could have resulted in the same number of clicks that the advertiser actually gained in his current stay. More formally, the critical series may be computed as follows. For every advertiser i and any given time t, there may be three possibilities considered:
1. i did not gain an impression at time t. Denote the set of critical values at times such that i did not get an impression in a stay $[\bar{a}_i, t]$ by $W_{1t}^i$;
2. i had an impression but not a click through at time t. Denote the set of critical values at times such that i received an impression but not a click in a stay $[\bar{a}_i, t]$ by $W_{2t}^i$; and
3. i had an impression and a click through at time t. Denote the set of critical values at times such that i received an impression and a click in a stay $[\bar{a}_i, t]$ by $W_{3t}^i$.

Accordingly, if an advertiser i may have $w_i$ click-throughs in stay $[\bar{a}_i, t]$, the algorithm may sum the $w_i$ lowest critical values from the sets $W_{1t}^i \cup W_{3t}^i$. As used herein, a click-through status set may mean any of the sets $W_{1t}^i$, $W_{2t}^i$, $W_{3t}^i$. This payment scheme (TTPS) may yield the desired prices to allow an advertiser i to gain at most $O(v_i)$, regardless of how untruthfully values of private information may be reported by advertisers. Moreover, such a gain may be achieved if i's budget becomes depleted.

In general, a multi-armed bandit auction algorithm may be applied for the general case when there may be multiple slots available of equal quality at any given time to allocate under budget and time constraints. Advertisers may report their private information including arrival time, departure time, value per click, and budget. And the algorithm may approximate the maximal welfare that may be achieved under budget and time constraints by bounding the possible gain from any possible lie an advertiser might submit in reporting private information. The following pseudo-code may represent the main algorithm in an embodiment for a multi-armed bandit auction under budget and time constraints:

Budgeted MAB Auction Algorithm
1. Call "Initialization Sub Procedure" to initialize parameters for any arriving advertisers
2. Call "Sub Procedure for Choosing the Advertisers to Sample" to determine which subset of advertisers to consider to sample
3. Randomly pick K advertisers from $S'_t$ to sample such that if advertiser $i \in S'_t$ is picked then if $i \in S'_\tau$ where $\tau \leq t$ there does not exist an advertiser $j \in S'_\tau$ and $j \in S'_t$ that was not sampled from time $\tau$ to time t.
4. Call "Update Parameters for Chosen Advertisers" to update parameters for sampled advertisers
5. For every advertiser $i \in S_t$
   a. Compute the critical values $c_i^t$.
   b. Compute interim price according to Compute-Price (input: for $\bar{a}_i \leq \tau \leq t$ $c_i^\tau$, $w_i$ output: $p_i^t$) and update remaining budget $B_i^t = \bar{b}_i - p_i^t$.
   c. Charge departing advertisers their current interim price: if $\bar{l}_i = t$, i is charged $p_i^t = p^{l_i}$.
6. Update the time t.

In general, the algorithm samples each advertiser i in turn until there is a sufficient gap between the observed payoffs of the K highest advertisers that have remaining budget and advertiser i such that with sufficient probability the $i^{th}$ advertiser is not one of the advertisers desirable to retain. The algorithm removes all of the advertisers with a sufficiently large gap and continues to sample the remaining advertisers as long as there is not a large enough gap between the best advertisers and the rest of the advertisers to remove them. Critical values may then be updated for all advertisers, an interim price may be computed for all advertisers and departing advertisers may then be charged the computed interim price.

Figure 3:
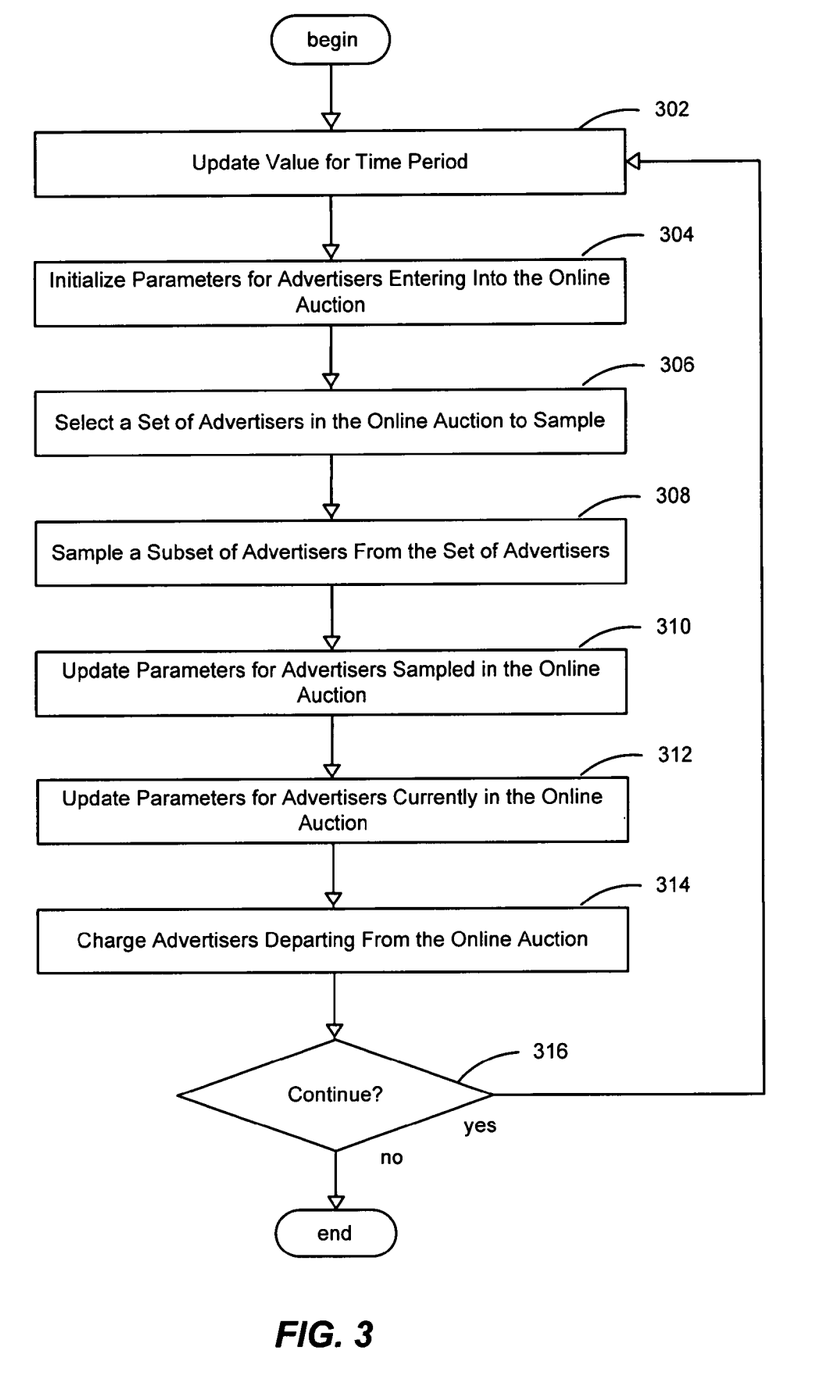
FIG. 3 is a flowchart generally representing the steps undertaken in one embodiment using sampling for scheduling advertisements in an online auction with budget and time constraints, in accordance with an aspect of the present invention.

FIG. 3 presents a flowchart generally representing the steps undertaken in one embodiment using sampling for scheduling advertisements in an online auction with budget and time constraints. The steps of FIG. 3 represent the general steps of the pseudo-code of the Budgeted MAB Auction Algorithm presented above. At step 302, the value for the time period may be updated. In an embodiment, the value for the time period may be used as a synchronization device since advertisers may arrive and depart in the online auction at any time. Parameters for advertisers entering the online auction may be initialized at step 304. At step 306, a set of advertisers in the online auction may be selected to sample, and then a subset of the selected set of advertisers in the online auction may be sampled at step 308. Parameters for advertisers sampled in the online auction may be updated at step 310. And then parameters may be updated for advertisers in the online auction, including those not sampled, at step 312. Finally, advertisers departing from the online auction may be charged at step 314. In an embodiment, departing advertisers may be charged their current interim price calculated as follows: if $\bar{l}_i = t$, i is charged $p_i^t = p^{l_i}$. It may be decided at step 316 to continue processing at step 302 or to end the online auction with budget and time constraints.

The following pseudocode may represent the Initialization Sub Procedure used by the Budgeted MAB Auction Algorithm to initialize parameters for arriving advertisers:

Initialization Sub Procedure
1. The arriving advertiser i may report his value per click $\bar{v}_i$, arrival time $\bar{a}_i$, departure time $\bar{l}_i$, and budget $\bar{b}_i$ that can be spent between $\bar{a}_i \leq t \leq \bar{l}_i$. Note that these reported values can be incorrect;
2. For each arriving advertiser, set the variables' values as follows:
   Set initial click through rate, $x_t^i = 0$
   Set total clicks, $w_i = 0$
   Set the price charged for current clicks, $p_i^t = 0$
   If this is i's first visit, set the exposure $e_i = 0$.

Figure 4:
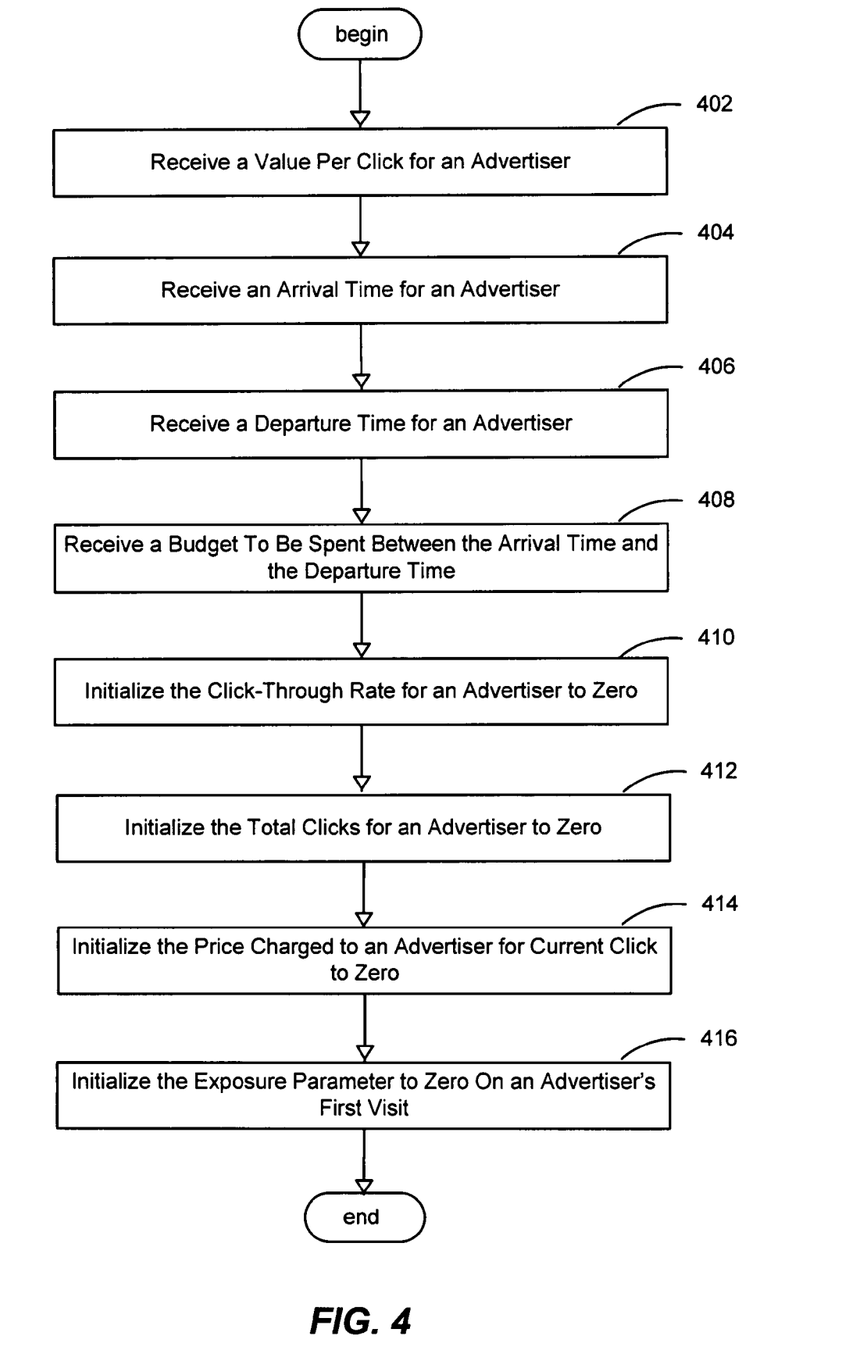
FIG. 4 is a flowchart generally representing the steps undertaken in one embodiment for initializing parameters for advertisers entering into an online auction with budget and time constraints, in accordance with an aspect of the present invention.

FIG. 4 presents a flowchart generally representing the steps undertaken in one embodiment for initializing parameters for advertisers entering into the online auction. At step 402, a value per click may be received for an advertiser. An arrival time may be received for an advertiser at step 404, and a departure time may be received for an advertiser at step 406. A budget to be spent between the arrival time and the departure time may also be received for an advertiser at step 408. At step 410, the click-through rate for an advertiser may be initialized to zero, and the total clicks for an advertiser may be initialized to zero at step 412. The price charged to an advertiser for a current click may also be initialized to zero at step 414. And the exposure parameter for an advertiser may be initialized at step 416 to zero on the advertiser's first visit. On subsequent visits, this step may not be performed.

The following pseudocode may represent the Sub Procedure for Choosing The Advertisers To Sample to determine which subset of advertisers to consider to sample:
Choosing The Advertisers To Sample
1. Set $S_t$ to be the set of advertisers currently in the system (by their reported arrival and departure times)
2. Set $S'_t = S_t$ to be the set of potential advertisers to sample
3. For every advertiser $i \in S_t$, define confidence parameter:

$$\gamma e_i = \sqrt{\frac{\log(cne_i^2/\chi)}{e_i} \cdot \frac{1}{K}}$$

where c is a constant and $\chi$ is a probability parameter
4. Remove from the set of advertisers $S'_t$ all of the suboptimal advertisers: for every advertiser $i \in S_t$, if there exist K other advertisers z such that $\min\{x_z^t, B_z^t\} - \min\{x_i^t, B_i^t\} > \gamma_{e_i} + \gamma_{e_z}$ (i.e., z has remaining budget and payoff which is larger than i's even if the errors are in i's favor), then i is suboptimal and hence we can update $S'_t = S'_t \setminus i$.

Figure 5:
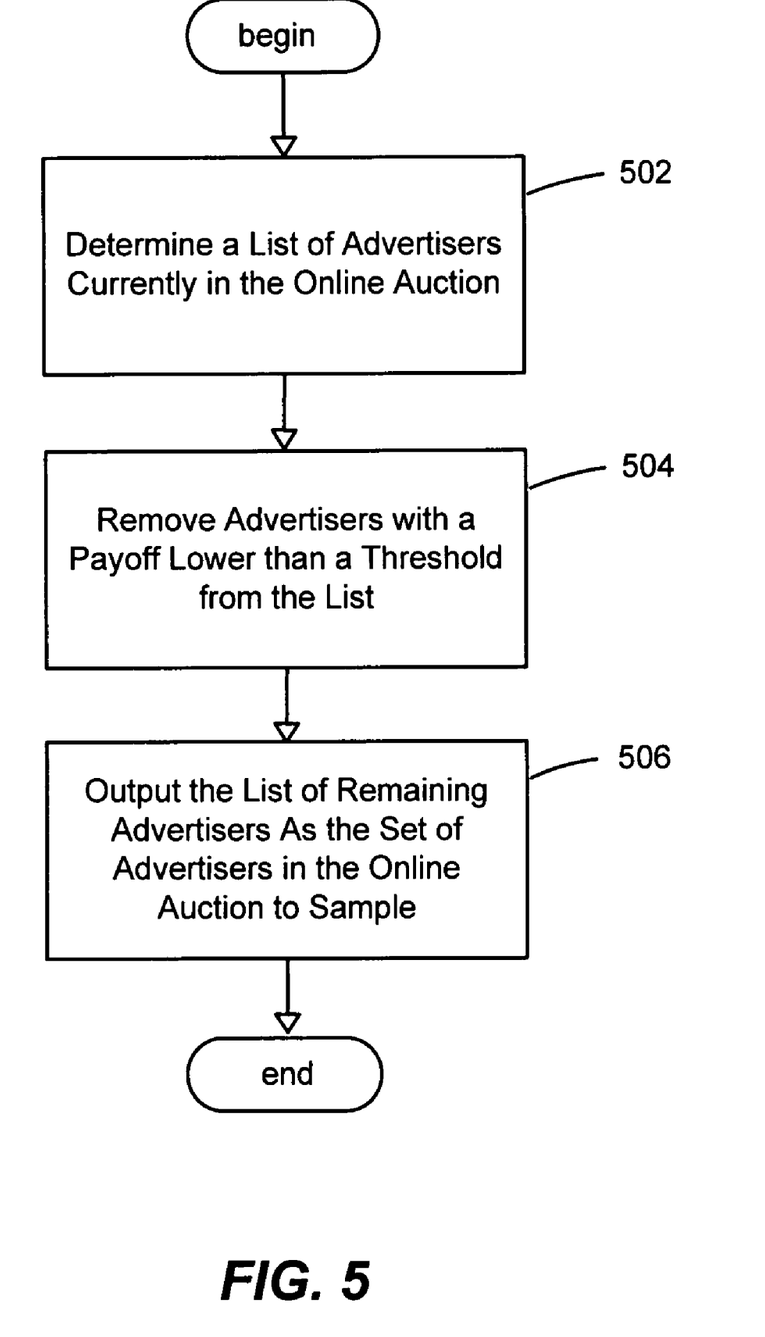
FIG. 5 is a flowchart generally representing the steps undertaken in one embodiment for selecting the set of potential advertisers to sample in an online auction with budget and time constraints, in accordance with an aspect of the present invention.

FIG. 5 presents a flowchart generally representing the steps undertaken in one embodiment for selecting the set of potential advertisers in an online auction to sample. At step 502, a list of advertisers currently in the online auction may be determined. At step 504, advertisers with a payoff lower than a threshold may be removed from the list. In the embodiment of the Sub Procedure for Choosing The Advertisers To Sample, suboptimal advertisers i may be removed from the set of advertisers $S'_t$ if there exist K other advertisers z with a remaining budget and payoff which may be larger than i's, then i may be suboptimal and may be removed from the set of advertisers, so that $S'_t = S'_t \setminus i$. And the list of remaining advertisers may be output at step 506 as the set of advertisers to sample in the online auction during the current time period. Note that for each time period, the set of potential advertisers in the online auction to sample are selected from a list of advertisers currently in the online auction as described at step 502 and then suboptimal advertisers are removed at step 504 just for the current time period.

Figure 6:
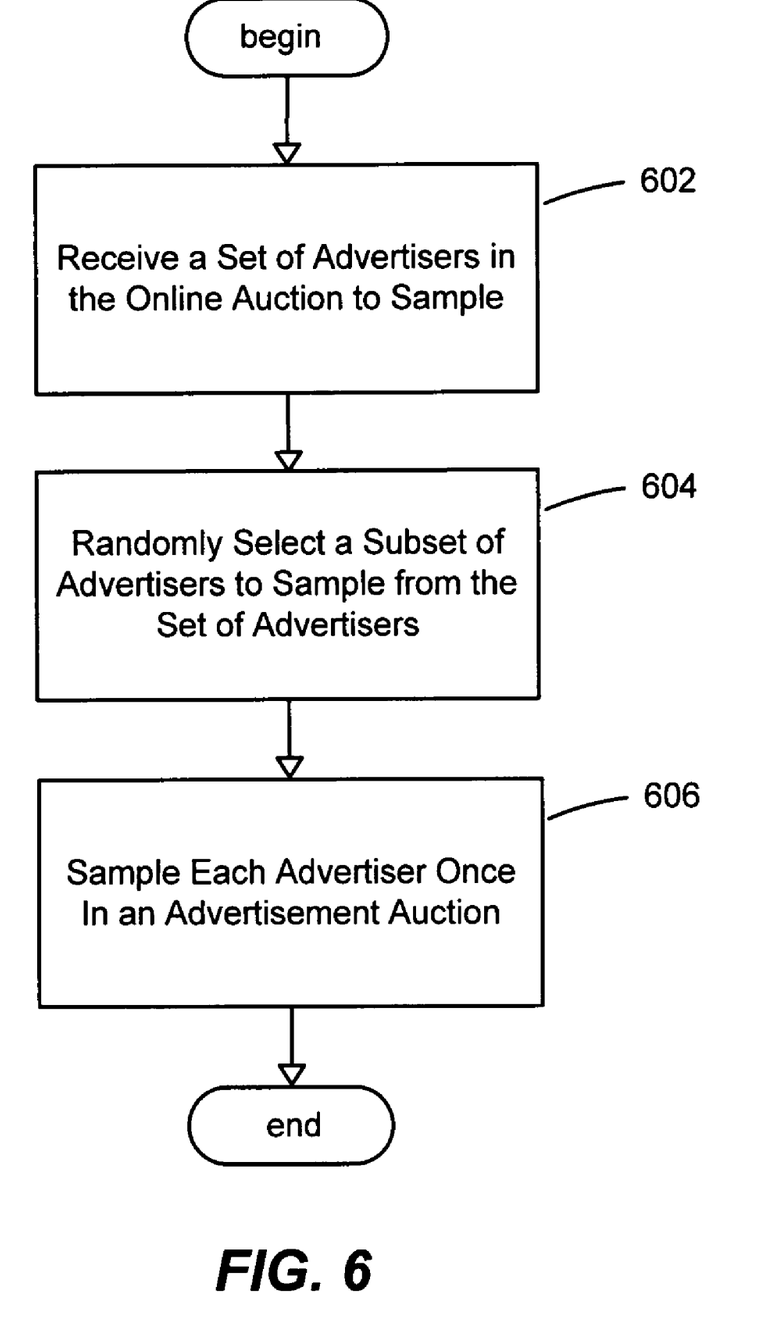
FIG. 6 is a flowchart generally representing the steps undertaken in one embodiment for randomly selecting a subset of advertisers to sample from the set of potential advertisers in an online auction with budget and time constraints, in accordance with an aspect of the present invention.

FIG. 6 presents a flowchart generally representing the steps undertaken in one embodiment for randomly selecting a subset of advertisers to sample from the set of potential advertisers in an online auction. At step 602, a list of potential advertisers to sample in the online auction may be received. At step 604, a subset of advertisers may be randomly selected from the list of potential advertisers to sample. For example, K advertisers may be randomly picked from $S'_t$ to sample in the embodiment of the Budget MAB Auction Algorithm. And each advertiser in the subset of advertisers selected in step 604 may be sampled once in the online auction at step 606.

The following pseudocode may represent the Sub Procedure for Update Parameters for Chosen Advertisers to update parameters for sampled advertisers:
Update Parameters for Chosen Advertisers
For every sampled advertiser $i \in S'_t$ update parameters:
1. $e_i = e_i + 1$ and update $\gamma e_i$ accordingly,
2. If i got a click update $w_i = w_i + 1$,
3. Update $\alpha_i^t$ (and $x_i^t$) accordingly if i was click/not clicked.

Figure 7:
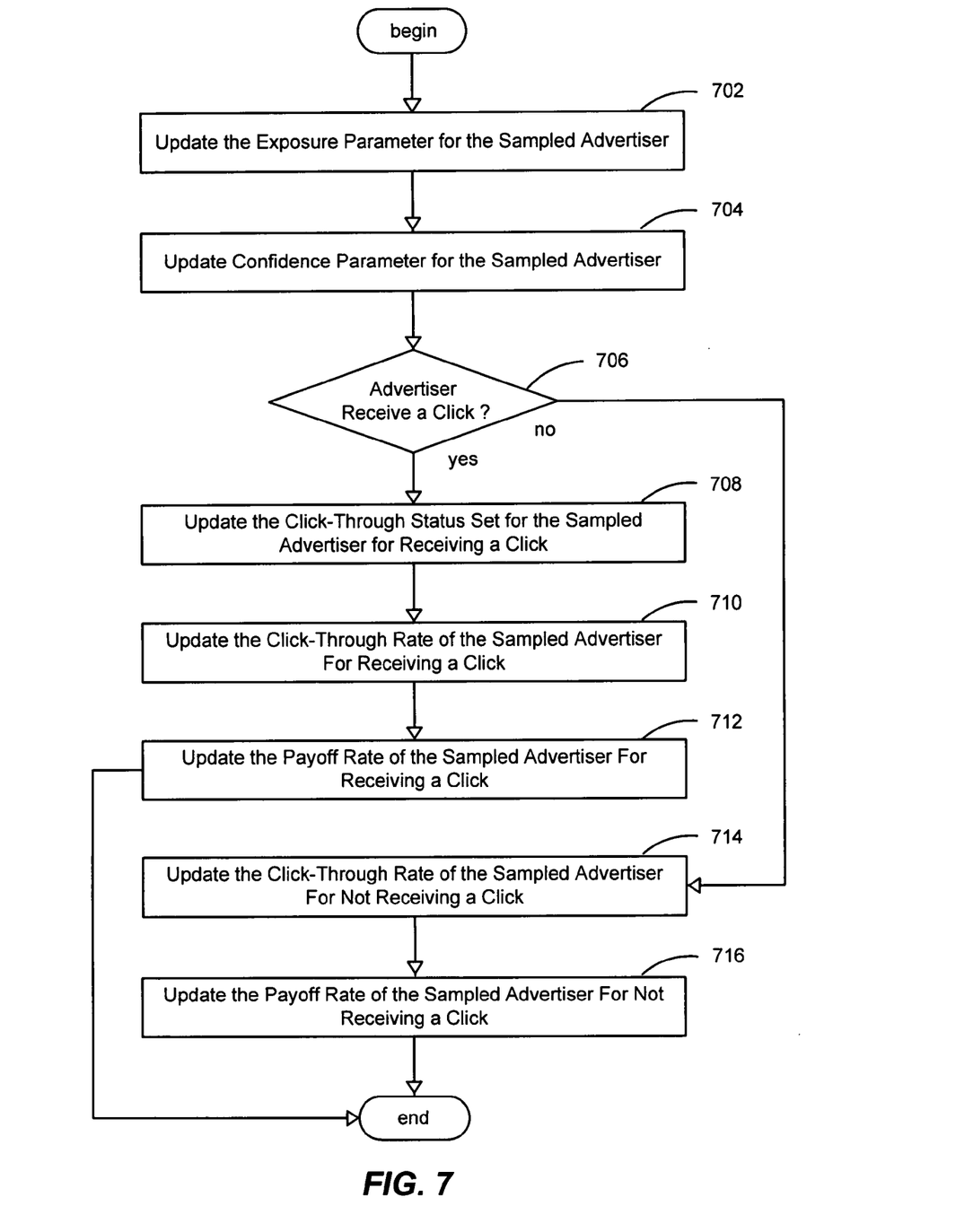
FIG. 7 is a flowchart generally representing the steps undertaken in one embodiment for updating parameters for sampled advertisers in an online auction with budget and time constraints, in accordance with an aspect of the present invention.

FIG. 7 presents a flowchart generally representing the steps undertaken in one embodiment for updating parameters for sampled advertisers. At step 702 an exposure parameter for a sampled advertiser may be updated, and a confidence parameter for a sampled advertiser may be updated at step 704. In the embodiment of the Sub Procedure for Update Parameters for Chosen Advertisers, for instance, the exposure parameter $e_i$ may be incremented such as $e_i = e_i + 1$, and $\gamma e_i$ may be updated. It may be determined at step 706 whether an advertiser may have received a click for a sampled advertisement displayed. If so, then the click-through status set for the sampled advertiser may be updated at step 708 for receiving a click, the click-through rate of the sampled advertiser may be updated at step 710 for receiving a click, and the payoff rate of the sampled advertiser may be updated at step 712 for receiving a click. If it may be determined at step 706 that an advertiser may not have received a click for a sampled advertisement displayed, then the click-through rate of the sampled advertiser may be updated at step 714 for not receiving a click, and the payoff rate of the sampled advertiser may be updated at step 716 for not receiving a click. In the example of the embodiment of the Sub Procedure for Update Parameters for Chosen Advertisers, the total number of clicks may be incremented, $w_i = w_i + 1$, if an advertiser received a click and the click-through rate, $\alpha_i^t$, and the payoff rate, $x_i^t$, may be updated accordingly if an advertiser i received a click or did not receive a click. Then processing for updating parameters for sampled advertisers may be finished.

Figure 8:
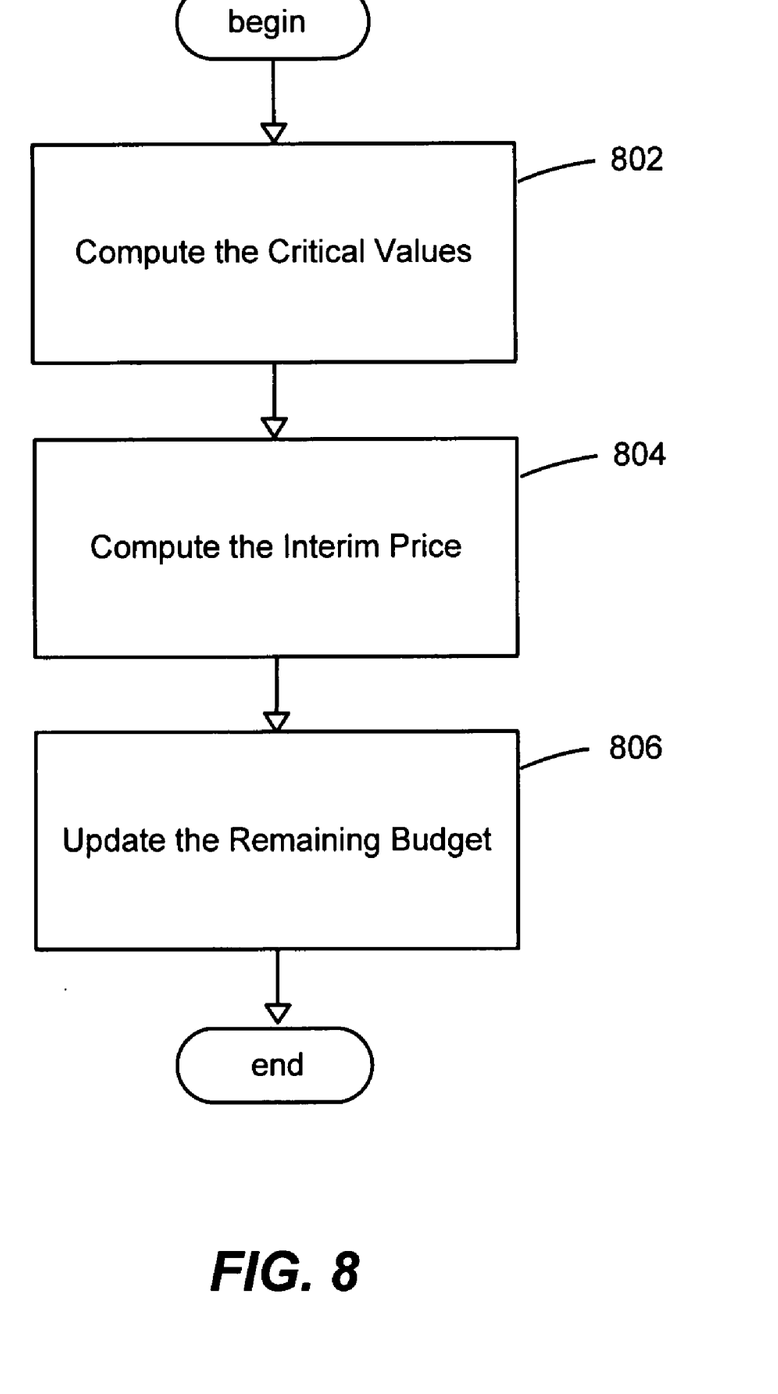
FIG. 8 is a flowchart generally representing the steps undertaken in one embodiment for updating parameters for advertisers in an online auction with budget and time constraints, in accordance with an aspect of the present invention.

FIG. 8 presents a flowchart generally representing the steps undertaken in one embodiment for updating parameters for advertisers in the online auction. At step 802, the critical values for a sampled advertiser may be updated. For instance, the critical values $c_i^t$ may be computed. At step 804, the interim price for a sampled advertiser may be updated. For example, the click-through status sets $W_{1t}^i$ and $W_{3t}^i$ may be used to sum the $w_i$ lowest critical values from the union of the sets, $W_{1t}^i \cup W_{3t}^i$ to compute the price in the embodiment of Compute Price described below in conjunction with FIG. 9. At step 806, the budget remaining may be updated. In an embodiment, the remaining budget may be updated using the following equation: $B_i^t = \bar{b}_i - p_i^t$.

The following pseudocode may represent the Sub Procedure for Compute Price to update the interim price charged to advertisers:
Compute Price(input: for $a_i \leq \tau \leq t$ $c_i^\tau$, $w_i$ output: $p_i^t$)
$p_i^t = \arg\min\{\Sigma_{w_i} c_i^\tau\}$ such that $a_i \leq \tau \leq t$ and $c_i^\tau \in W_{1t}^i \cup W_{3t}^i$.
The Compute Price algorithm may choose the $w_i$ smallest critical values in $W_{1t}^i \cup W_{3t}^i$.

Figure 9:
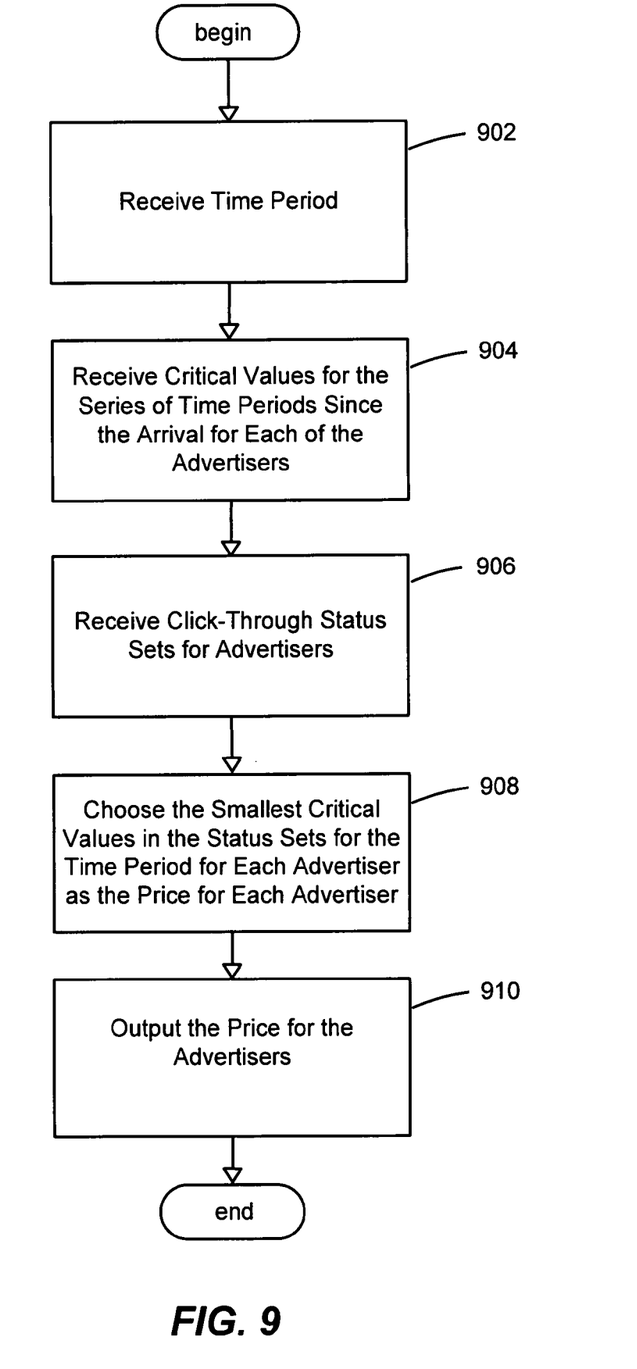
FIG. 9 is a flowchart generally representing the steps undertaken in one embodiment for updating an interim price for advertisers in the online auction with budget and time constraints, in accordance with an aspect of the present invention.

FIG. 9 presents a flowchart generally representing the steps undertaken in one embodiment for updating an interim price for advertisers in the online auction. At step 902, a time period may be received for updating an interim price for advertisers in the online auction. At step 904, critical values calculated for the time periods occurring since the arrival time of each of the advertisers may be received for each of the advertisers in the online auction. At step 906, click-through status sets may be received for advertisers and the price may be determined by choosing the smallest critical values in the status sets at step 908 for the time periods occurring since the arrival time of each of the advertisers in the online auction. In an embodiment of the Compute Price pseudo-code, the click-through status sets $W_{1_t}^i$ and $W_{3_t}^i$ may be used to sum the $w_i$ lowest critical values from the union of the sets, $W_{1_t}^i \cup W_{3_t}^i$, using the following equation for the price: $p_i^t = \arg\min\{\Sigma_{w_j} c_i^\tau\}$ such that $a_i \leq \tau \leq t$ and $c_i^\tau \in W_{1_t}^i \cup W_{3_t}^i$. At step 910, the price for the advertisers may be output.

Those skilled in the art may appreciate that the system and method for payment may be applied in general to online markets other than an online advertising auction. For instance, the system and method for payment may be applied in an online market where there may be buyers and sellers of goods. In such an online market, each seller may have budget and time constraints. For example, a seller may be budgeted for selling a limited amount of goods and may have an arrival time and departure time for the online market. Sellers may report their private information including arrival time, departure time, value per item of goods, and budget. A status set for such an online market may be defined as for every seller i and any given time t, there may be three possibilities considered: (1) i did not have an item of goods allocated for display at time t, and the set of critical values at times such that i did not get an allocation for display in a stay $[\bar{a}_i, t]$ may be denoted by $W_{1_t}^i$; (2) i had an allocation for display of an item of goods but did not receive a selection of an item of goods for purchase by a buyer at time t, and the set of critical values at times such that i had an allocation for display of an item of goods but did not receive a selection of an item of goods for purchase by a buyer in a stay $[\bar{a}_i, t]$ may be denoted by $W_{2_t}^i$; and (3) i had an allocation for display of an item of goods and received a selection of an item of goods for purchase by a buyer at time t, and the set of critical values at times such that i had an allocation for display of an item of goods and received a selection of an item of goods for purchase by a buyer in a stay $[\bar{a}_i, t]$ may be denoted by $W_{3_t}^i$. Furthermore, the critical values at each time may be the minimum value seller i can report to receive an allocation for display of an item of goods. The payment rules may then be applied to sellers for computing the critical value per round and the critical values series for possible rounds during a stay in the online market.

Thus the present invention may truthfully schedule advertisements in an online auction with budget and time constraints using sampling. The algorithm employed by the modified multi-armed bandit mechanism may provide a budget-constrained sponsored search auction with truthful guarantees on budget, arrivals, departures, and valuations. Moreover, the system and method may approximate the maximum welfare that can be achieved under budget constraints. Thus, the mechanism provided by the present invention may motivate advertisers to report their true budget, arrival time, departure time, and value per click in an online sponsored search auction.

As can be seen from the foregoing detailed description, the present invention provides an improved system and method for using sampling for scheduling advertisements in an online auction with budget and time constraints. Through a process of valuation discovery, the click-through rate for advertisements may be learned and the value of advertisements to advertisers may be learned. A modified multi-armed bandit may be used for sampling new advertisements by allocating advertisements for web page placements of equal quality and optimizing payments to maximize the welfare of the advertisers while remaining within advertiser's budget and time constraints. As the process of valuation discovery progresses, the algorithm more closely approximates the click-through rates for advertisements in order to allocate web page placements to advertisements that may maximize the welfare of the advertisers while remaining within advertiser's budget and time constraints. Such a system and method may provide advertisers an incentive to declare bids with true valuations, report their true budget, arrival time and departure time, and may approximate the maximal welfare that may be achieved under budget and time constraints by bounding the possible gain from any possible lie an advertiser might submit in reporting private information. As a result, the system and method provide significant advantages and benefits needed in contemporary computing, and more particularly in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for payment in an online advertising auction, said method comprising:
    using an input/output subsystem receiving from each of a plurality of advertisers bidding for advertising slots in the online advertising auction:
        a bid for an advertising slot based on a keyword, wherein said bid comprises:
            an arrival time at the online advertising auction;
            a departure time at the online advertising auction;
            a budget to be spent between the arrival time and the departure time, wherein said budget may not be exceeded; and
            a value per click;
    wherein it is assumed that the budget is greater than the value per click; and using a processor device to perform:
    computing critical values for each of the plurality of advertisers in a given time period of the online advertising auction, wherein a critical value is a minimum value for the advertising slot in the given time period and computing the critical values comprises collecting status set parameters from the subset of advertisers;
    computing an interim price based upon the critical values for each of the plurality of advertisers in the online advertising auction;
    charging the plurality of advertisers departing from the online advertising auction the computed interim price;
    updating a remaining budget of each of the plurality of advertisers in the online advertising auction; and,
    collecting the status set parameters comprises: allocating an advertising slot for each advertiser;
    monitoring the advertising slot for each of the selected time periods;
    determining a click-through status as a sum of clicks received during each of the selected time periods;

determining the critical value as a minimum sum of values that could have resulted in the click-through status, wherein the values comprise:
a first value representing a value for the advertising slot when the advertiser did not gain an impression during a time period;
a second value representing a value for the advertising slot when the advertiser had an impression but not a click through during a time period; and
a third value representing a value for the advertising slot when the advertiser had an impression and a click-through during a time period; and,
the sum of values represents a union of the first and third values.

2. The method of claim 1 wherein computing the critical values comprises:
selecting time periods occurring since the arrival times of the plurality of advertisers in the online advertising auction;
initializing status set parameters to zero for the advertisers entering and departing the online auction during the selected time periods;
selecting a subset of the advertisers for sampling from among the advertisers entering and departing the online auction during the selected time periods;
collecting status set parameters from the subset of advertisers; and
setting the critical values for the subset of advertisers based on the collected status set parameters.

3. The method of claim 2 wherein selecting the subset of advertisers comprises:
determining the advertisers currently in the online advertising auction; and
removing the advertisers with a payoff rate lower than a threshold.

4. The method of claim 2 wherein initializing the status set parameters comprises:
initializing the click-through rate for an advertiser to zero;
initializing the click-through status for an advertiser to zero; and
initializing the payoff rate per click to zero.

5. The method of claim 2 wherein determining the critical value further comprises:
determining a click-through rate as a probability of receiving a click when the advertiser is allotted an impression.

6. The method of claim 5 further comprising estimating an accuracy of the click-through rate based on a number of impressions received by the advertiser.

7. The method of claim 2 wherein determining the critical value further comprises:
incrementing a payoff rate when receiving a click; and
decrementing the payoff rate when not receiving a click.

8. A non-transitory computer-readable medium having computer-executable instructions for performing steps of:
using an input/output subsystem receiving from each of a plurality of advertisers bidding for advertising slots in the online advertising auction:
a bid for an advertising slot based on a keyword, wherein said bid comprises:
an arrival time at the online advertising auction;
a departure time at the online advertising auction;
a budget to be spent between the arrival time and the departure time, wherein said budget may not be exceeded; and
a value per click;
wherein it is assumed that the budget is greater than the value per click; and using a processor device to perform:
computing critical values for each of the plurality of advertisers in a given time period of the online advertising auction, wherein a critical value is a minimum value for the advertising slot in the given time period and computing the critical values comprises collecting status set parameters from the subset of advertisers;
computing an interim price based upon the critical values for each of the plurality of advertisers in the online advertising auction;
charging the plurality of advertisers departing from the online advertising auction the computed interim price; and
updating a remaining budget of each of the plurality of advertisers in the online advertising auction; and,
collecting the status set parameters comprises: allocating an advertising slot for each advertiser;
monitoring the advertising slot for each of the selected time periods;
determining a click-through status as a sum of clicks received during each of the selected time periods;
determining the critical value as a minimum sum of values that could have resulted in the click-through status, wherein the values comprise:
a first value representing a value for the advertising slot when the advertiser did not gain an impression during a time period;
a second value representing a value for the advertising slot when the advertiser had an impression but not a click through during a time period; and
a third value representing a value for the advertising slot when the advertiser had an impression and a click-through during a time period; and,
the sum of values represents a union of the first and third values.

* * * * *